Patented July 16, 1935

2,008,304

UNITED STATES PATENT OFFICE 2,008,304

SIZING MATERIAL

Max W. Hendrich, Millington, N. J., assignor of one-fourth to R. W. Semerad, Millington, N. J., and three-fourths to Harry Radzinsky, New York, N. Y.

No Drawing. Application August 29, 1933, Serial No. 687,335

3 Claims. (Cl. 134—18)

For a long time painters and decorators have searched for a cheap preparation which, when applied to stone, concrete, brick and stuccoed surfaces intended to be subsequently covered by oil or water paint, will neutralize free alkali in such materials and prevent the saponification by alkali of the binder or oil in the paint film. The object of the invention is to provide a preparation which will fulfill these requirements and which will damp-proof the surface to which it is applied.

Such a preparation, to be entirely satisfactory, must not close the pores of the surface to which it is applied, but on the other hand must stop suction of the surface to which paint is subsequently applied and consequently chalking of the paint is prevented, and its elasticity, life and color is materially maintained and lengthened. The improved sizing material meets these requirements. It is more readily applied than glue or varnish size; when supplied to the painter it is ready for use without stirring, heating or other treatment; is not affected by heat or cold and even in freezing weather will not precipitate the solids in it and will not become clouded. Paint applied over a surface which has been sized with this material is easily applied since it flows smoothly on the surface and requires no pouncing.

In preparing the material, the following formula is used:

100 gallons of vehicle, such as a petroleum distillate, (any light lubricating oil down through kerosene, naptha and gasoline)
2 gallons of acetone
30 lbs. of solids (for an approximately 10 per cent solution) such as aluminum stearate, aluminum oleate or both
16 ounces 80 per cent acetic acid ($CH_3COOH$)
96 ounces 38 per cent nitric acid ($HNO_3$), as solvent.

The proportions set forth may be altered to suit different requirements.

To compound the solution, 20 gallons of the vehicle (petroleum distillate or the like) and the 30 pounds of aluminum stearate or oleate are placed in a steam-jacketed kettle and heated to a temperature of 250 degrees Fahrenheit or more. The mixture is stirred while being heated, and while being stirred 40 gallons of the vehicle should be added. Then 2 gallons of acetone are added. When these ingredients are well mixed, 40 gallons of vehicle should be added and the mixture then allowed to cool to a temperature of about 120 degrees Fahrenheit. Then 16 ounces of acetic acid are added and the temperature of the mix is heated to raise it to 250 degrees Fahrenheit. The mixture is thereupon thoroughly stirred and permitted to cool. The mixture is then allowed to stand for some hours (preferably over night) and the next day it is re-heated to 120 degrees Fahrenheit, and 96 ounces of nitric acid are added, the solution being stirred to thoroughly incorporate the acid in it. The solution is then permitted to cool and is ready for use.

I am aware that in the past, efforts have been made to mix aluminum stearate or oleate with a petroleum vehicle but such efforts have resulted merely in the production of a solution of colloidal nature, or a suspensoid, in which there was no true mixture of the aluminum stearate or oleate with the vehicle, so that the preparation was cloudy and required heat in cold weather to bring it back into workable condition. Such mixtures also did not permit the use of a sufficiently high percentage of solids in solution, the greatest known percentage being approximately five per cent.

The solution herein described is a true solution and will not precipitate regardless of temperature changes and can easily carry double the percentage of solids heretofore carried in prior mixtures. The introduction of nitric acid into the mixture acts to change the suspensoidal mixture of stearate and petroleum distillate into a true solution which may easily contain double the usual amount of stearate found in suspensoidal mixtures. This large percentage of stearate plus the free acid in the solution form it into a neutralizing agent for free lime which is inherent in most building materials that are to be painted.

The solution when used, is not a pore filler as is the case with most sizing materials. It does not form a film on the surface to which it is applied but provides a natural bond for the subsequently applied paint layer. Paint flows easily over the surface to which the sizing has been applied and requires little brushing effort to spread it out. Despite the application of the paint on a relatively rough surface, no pouncing of the brush is necessary. On a coarse finish slab of plaster, coated with the solution, a metallic red paint was applied, and a paint saving of 40 per cent was realized as against an untreated portion of the same slab. On a medium finish slab the paint saving was 52 per cent. In both cases the paint on the treated portion of the slab possessed a fine glossy finish, while that on the untreated portion was dull and flat.

The aluminum stearate or oleate becomes insoluble as soon as the vehicle has evaporated. It is not affected by the alkali present in building material and plaster, and dampness will not penetrate a surface to which the solution is applied, unless under pressure.

What I claim is:—

1. A sizing material or the like comprising a petroleum distillate, aluminum stearate, acetic acid and nitric acid.

2. A sizing material or the like composed of the following materials mixed in the approximate proportions set forth:—100 gallons petroleum distillate, 2 gallons acetone, 30 pounds of aluminum stearate or oleate; 16 ounces acetic acid and 96 ounces nitric acid.

3. The method of making a sizing material consisting in heating a mixture of aluminum stearate and a petroleum distillate to a temperature of at least 250° Fahrenheit, stirring the heated mixture and adding acetone thereto, adding an additional quantity of the petroleum distillate and allowing the mixture to cool to a temperature of at least 120° F., adding acetic acid to the mixture while the mixture is at the reduced temperature, heating the mixture to at least 250° F., permitting the mixture to cool and stand, reheating it to a temperature of at least 120° F. and adding nitric acid to it and then permitting the mixture to cool.

MAX W. HENDRICH.